United States Patent
Cho

(10) Patent No.: US 8,468,963 B2
(45) Date of Patent: Jun. 25, 2013

(54) SHARP THREE-DIMENSIONAL EMBROIDERY AND METHOD FOR MANUFACTURING THE SAME

(75) Inventor: Byoung-Woo Cho, Seoul (KR)

(73) Assignee: Yupoong, Inc. (KR)

( * ) Notice: Subject to any disclaimer, the term of this patent is extended or adjusted under 35 U.S.C. 154(b) by 154 days.

(21) Appl. No.: 13/042,619

(22) Filed: Mar. 8, 2011

(65) Prior Publication Data

US 2011/0223376 A1    Sep. 15, 2011

(30) Foreign Application Priority Data

Mar. 11, 2010   (KR) .................. 10-2010-0021789

(51) Int. Cl.
   *D05C 15/00*   (2006.01)
   *D05C 17/00*   (2006.01)

(52) U.S. Cl.
   USPC .................................................. 112/475.22

(58) Field of Classification Search
   USPC .................. 112/439, 99, 117, 475.17–475.23
   See application file for complete search history.

(56) References Cited

U.S. PATENT DOCUMENTS

| 5,399,410 | A  | * | 3/1995  | Urase et al. .................. 428/102 |
| 6,263,817 | B1 | * | 7/2001  | Tajima et al. ............ 112/475.22 |
| 6,925,947 | B2 | * | 8/2005  | Lin et al. .................. 112/475.22 |
| 7,011,034 | B2 | * | 3/2006  | Cho ......................... 112/475.22 |
| 7,308,861 | B2 |   | 12/2007 | Cho |
| 7,946,236 | B2 | * | 5/2011  | Butcher .................... 112/475.18 |
| 2005/0061220 | A1 | * | 3/2005 | Wang ...................... 112/475.22 |

FOREIGN PATENT DOCUMENTS

| KR | 10-2003-002316 | 3/2003 |
| KR | 10-2003-0023165 | 3/2003 |

\* cited by examiner

*Primary Examiner* — Ismael Izaguirre
(74) *Attorney, Agent, or Firm* — Fellers, Snider, Blankenship, Bailey & Tippens, P.C.

(57) ABSTRACT

The present invention relates to sharp three-dimensional embroidery that can express a three-dimensional design in detail with a sharp three-dimensional effect and save time for cleaning a sheet residue by completely covering a sheet, and a manufacturing method thereof. Three-dimensional embroidery according to an exemplary embodiment of the present invention includes: at least two sheets layered on the upper surface of a fabric panel; at least two layers of embroidery being layered on the at least two sheets; and a covering member covering the at least two sheets and the at least two layers of embroidery with a predetermined design.

6 Claims, 11 Drawing Sheets

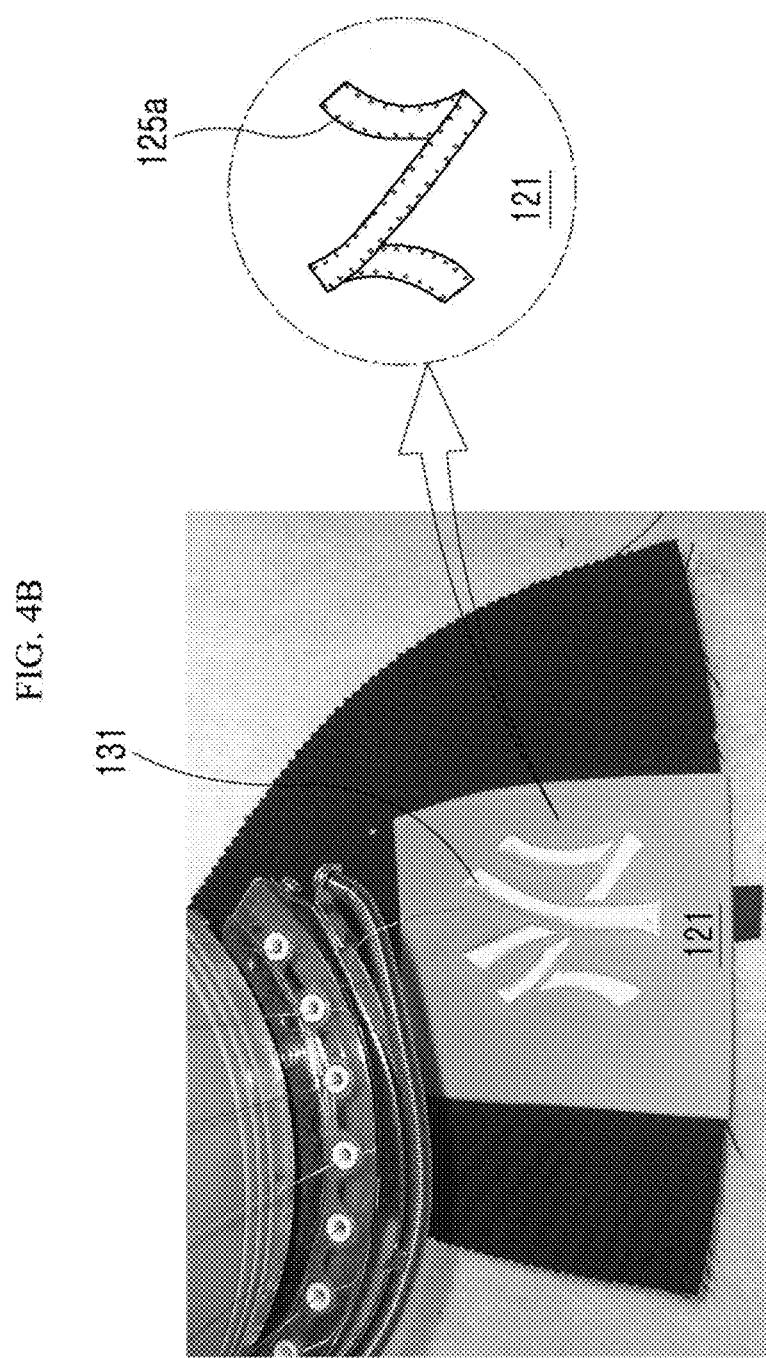

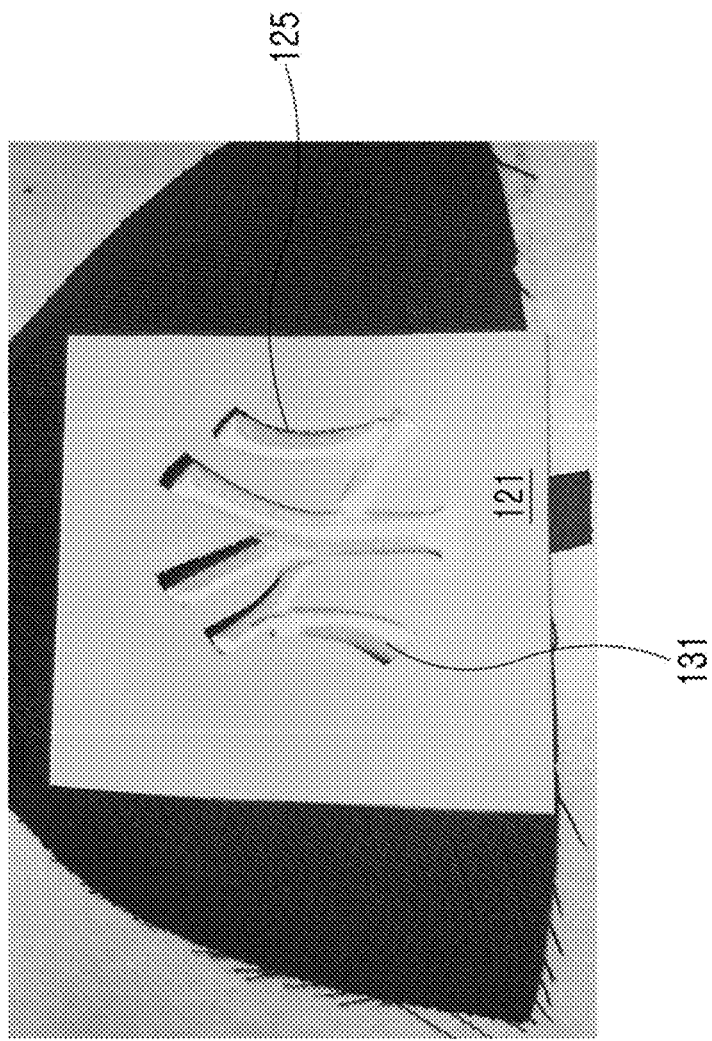

SHARP THREE-DIMENSIONAL EMBROIDERY AND METHOD FOR MANUFACTURING THE SAME

CROSS-REFERENCE TO RELATED APPLICATION

This application claims priority to and the benefit of Korean Patent Application No. 10-2010-0021789 filed in the Korean Intellectual Property Office on Mar. 11, 2010, the entire contents of which are incorporated herein by reference.

BACKGROUND OF THE INVENTION (a) Field of the Invention

The present invention relates to sharp three-dimensional embroidery and a manufacturing method thereof. More particularly, the present invention relates to sharp three-dimensional embroidery that can express various designs in detail, provide a sharp three-dimensional effect, and save time for a residue eliminating process by completely covering the residue of a sheet used for expressing the three-dimensional effect, and a manufacturing method thereof.

(b) Description of the Related Art

In general, embroidery provides esthetic beauty by embroidering various designs such as brand names, text, numbers, or figures using threads of various colors on a fabric panel including resin, leathers, or sheets.

However, an embroidery design embroidered by a typical embroidering machine does not have a three-dimensional effect.

Thus, various embroidering methods for realizing three-dimensional embroidery have recently been suggested.

For example, methods for expressing the three-dimensional effect by overlapping an embroidery thread multiple times or forming a design corresponding to an embroidery design and then attaching the design to the fabric panel have been used.

However, when the embroidery threads are overlapped several times, the desired embroidery may be insignificant or blunt and the embroidered portion may be unclean or hardened, causing difficulty in the next embroidering process and increasing labor.

In addition, when a design is separately manufactured and attached using an adhesive or a fixing member, the design may be easily detached due to frequent laundering, or the design may contaminate or damage the fabric panel so that the product quality may be deteriorated.

In order to solve the problem, a method for providing the three-dimensional effect by disposing a soft or semi-rigid sheet or film on the fabric panel and stitching along a predetermined embroidery design and removing the residual sheet or film has been recently suggested.

However, this method cannot provide sharp and various three-dimensional effects and the embroidery design may be damaged during sheet or film elimination. Furthermore, the time for eliminating the sheet or film residue may be increased when the residue is exposed outside the embroidery design, and much more time is consumed for the residue eliminating process.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide three-dimensional embroidery that can provide a detailed and sharp three-dimensional effect with ease while overcoming an expression limit, that is variously expressed without any problem in productivity and workability, that can remove sheet or film residue with ease, and that can save time for a sheet or film residue elimination, and a manufacturing method thereof.

Three-dimensional embroidery according to an exemplary embodiment of the present invention includes at least two sheets layered on the upper surface of a fabric panel, at least two layers of embroidery layered on the at least two sheets, and a covering member covering the at least two sheets and the at least two layers of embroidery with a predetermined design.

A manufacturing method of three-dimensional embroidery according to an exemplary embodiment of the present invention includes disposing a first sheet on the upper surface of a fabric panel, embroidering first embroidery on the first sheet, removing a separable portion of the first sheet at the circumference of the first embroidery, disposing a second sheet on the upper surface of the first embroidery, embroidering second embroidery inside the outer edge of the first embroidery on the second sheet, removing a separable portion of the second sheet at the circumference of the second embroidery; and covering the first and second embroidery with a predetermined design.

As described, above, according to the exemplary embodiments of the present invention, the three-dimensional embroidery is not insignificant or blunt so that a sharp three-dimensional effect can be accomplished, and embroidery can be easily performed because a soft or a semi-rigid sheet is provided on the portion to be embroidered even though multiple layers of embroidery are performed. In addition, working hours can be saved.

Further, according to the exemplary embodiments of the present invention, the original looks can be maintained even though it is washed several times, and the product quality can be enhanced because the sheet or multiple layers of embroidery are not externally exposed.

In addition, according to the exemplary embodiments of the present invention, the embroidering is performed along the inside of a predetermined design, and the sheet or film residue is covered by the final covering member, so that less time for a sheet or film residue cleaning process can be consumed.

BRIEF DESCRIPTION OF THE DRAWINGS

FIG. 4A to 4G are photographs of the manufacturing method of the embroidery according to the exemplary embodiment of the present invention.

DETAILED DESCRIPTION OF THE EMBODIMENTS

Figure 1A:
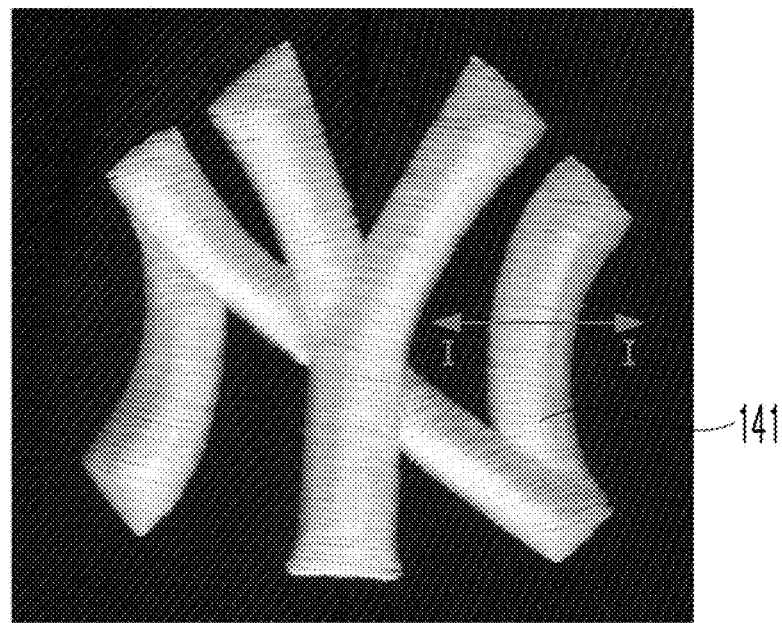
FIG. 1A and FIG. 1B are perspective views of three-dimensional embroidery according to an exemplary embodiment and a modified exemplary embodiment of the present invention.

Hereinafter, an exemplary embodiment of the present invention will be described in further detail with the accompanying drawings. In the drawings, explanatorily irrelevant portions are omitted to clearly describe the present invention, and like reference numerals designate like elements throughout the specification. Furthermore, in case it is judged that the detailed description of the well-known function or structures relevant to the embodiments may needlessly obscure the gist of the present invention, such a description will be omitted.

Figure 1B:
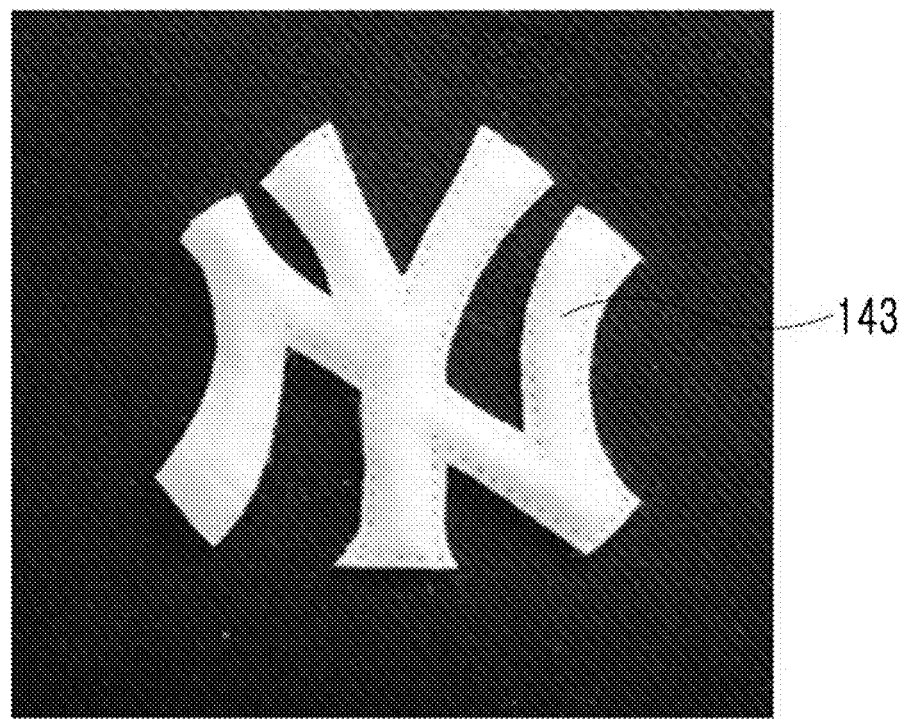
Figure 2:
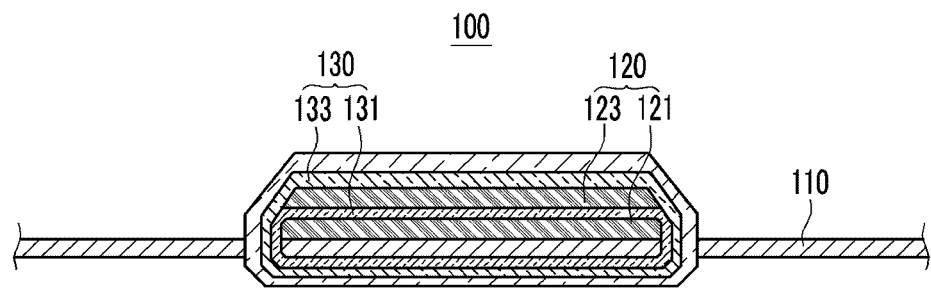
FIG. 2 is a cross-sectional view of FIG. 1 taken along the line I-I.

Referring to FIG. 1A to FIG. 2, three-dimensional embroidery according to an exemplary embodiment of the present invention will be described.

Three-dimensional embroidery 100 according to an exemplary embodiment of the present invention includes a fabric panel 110, at least two sheets 120 arranged with a predetermined gap therebetween on an upper portion of the fabric panel 110, at least two layers of embroidery 130 embroidered on the respective layer of the at least two sheets 120 with a predetermined gap therebetween, and a covering member 141 that covers the at least two sheets 120 and the at least two layers of embroidery 130 along the external circumferential lines thereof.

In further detail, a first sheet 121 with a design that is smaller than a predetermined embroidery design 101 remains within the edge of the predetermined embroidery design 101 on the fabric panel 110, and first embroidery 131 is formed by wrapping the first sheet 121 along the smaller design than the predetermined embroidery design 101.

In addition, a second sheet 123 is located on the first embroidery 131.

As described, the set of sheets 120 including at least two sheets (i.e., first and second sheets) reduced in size and the at least two layers of embroidery formed while surrounding the set of sheets 120 are covered by the covering member 141 that is embroidered along the predetermined embroidery design 101.

The covering member 141 is formed along the external circumferential line of the at least two layers of embroidery 131 and 133 containing the first and second sheets 121 and 123, so that sharp three-dimensional embroidery can be provided, and the covering member 141 covers all of the sheets 121 and 123 and the two layered embroidery 131 and 133, so that less time for a sheet or film remnants cleaning process that is performed after the final embroidery process can be consumed.

In addition, since the embroidery 130 and the covering member 141 are sequentially formed inside and along the predetermined embroidery design 101, preventing duplication or overlapping of the embroidery, and accordingly, the embroidered area is not hardened and the process speed can be improved.

Thus, as shown in FIG. 1A, the covering member 141 can cover the embroidery even through the embroidery is formed of multiple layers, and as shown in FIG. 1B, the covering member 141 can be formed of an appliqué covering member 143. The appliqué covering member 143 can be formed by cutting a material that can cover the embroidery 130, such as a fabric panel, a non-woven fabric, or leather into a predetermined design and attaching the cut material by sewing or adhesive.

Hereinafter, a manufacturing method of the embroidery according to the exemplary embodiment of the present invention will be described in detail with reference to FIG. 3 and FIG. 4A to FIG. 4G.

Figure 3:
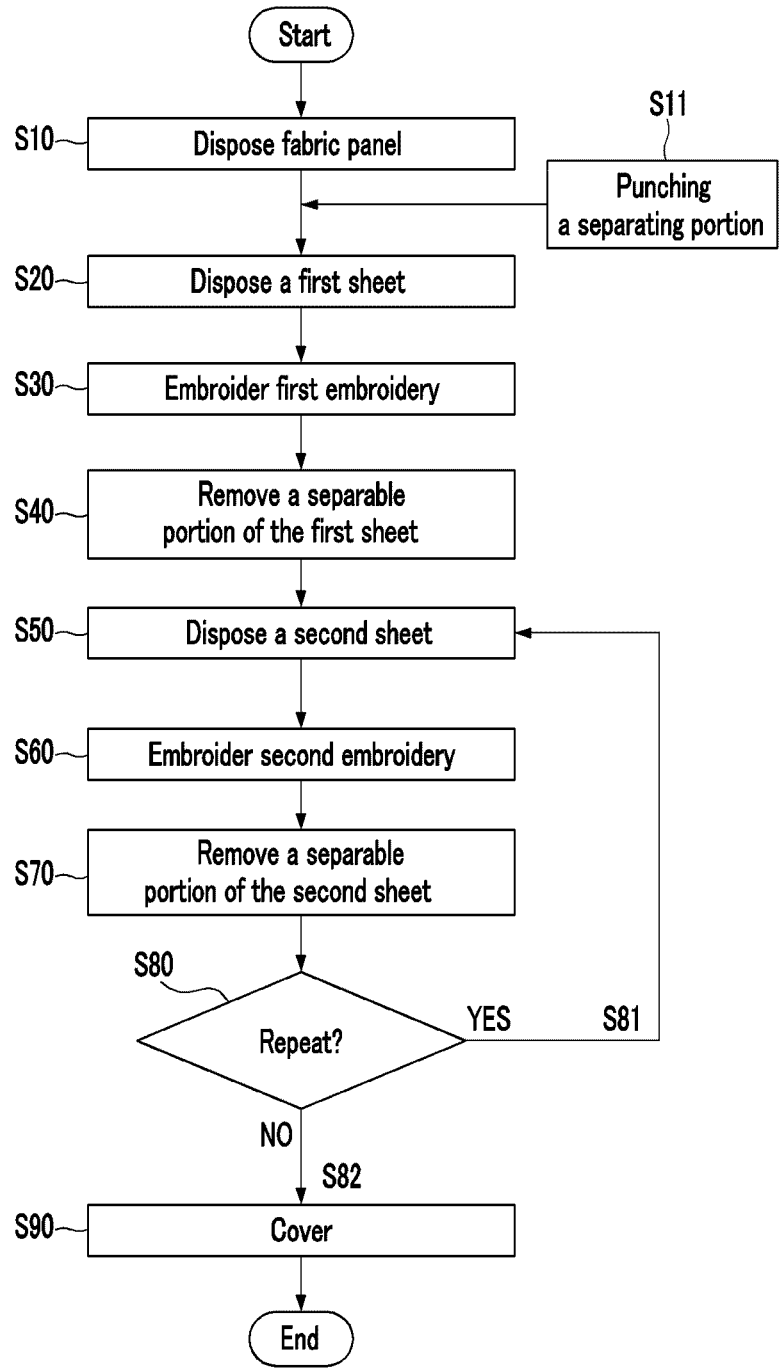
FIG. 3 is a flowchart of a manufacturing method of the embroidery according to the exemplary embodiment of the present invention.

Referring to FIG. 3, a manufacturing method of the embroidery according to the exemplary embodiment of the present invention includes: disposing the fabric panel 110 (S10); disposing the first sheet 121 on the top surface of the fabric panel 110 (S20); embroidering the first embroidery 131 on the first sheet 121 along the inside of the outlines of the predetermined embroidery design 101 (S30); removing a separable portion 125 of the first sheet 121 around the first embroidery 131 (S40); disposing a second sheet 123 on the top portion of the first embroidery 131 (S50); embroidering for forming the second embroidery 133 to be smaller than the first embroidery 131 on the second sheet 123 (S60); removing a separable portion 125 of the second sheet 123 around the second embroidery 133 (S70); determining whether to repeat disposing a sheet, embroidering, and removing a separable portion of the sheet until a sharp three-dimensional effect can be provided (S80); and covering at least two layers of embroidery along the outer edge of the predetermined embroidery design 101 (S90).

When it is determined that the sharp three-dimensional effect is sufficiently expressed in step S80, the covering (S90) is performed, and when it is determined that the sharp three-dimensional effect is not sufficiently expressed in step S80 (S81), the sheet disposing, the embroidering, and the removing of the separable portion are sequentially repeated.

Before or after disposing the fabric panel 110 in step S10, at least two sheets 121 and 123 are prepared with at least one of a soft or semi-rigid elastic sheet or a synthetic resin film, and punching holes 125a may be sequentially formed along a predetermined design of the first embroidery 131 or the second embroidery 133 in the inner edge of the predetermined embroidery design 101.

The set of sheets 120 may be formed of, for example, an ethylene vinyl acetate (EVA) resin film having excellent chemical resistivity and elasticity and less slipperiness when in contact with the fabric panel 110. Thus, when the set of sheets 120 is formed with the EVA resin film, the punching holes 125a can be preferably formed by embroidering without using an embroidery thread. In addition, when the second sheet 123 is formed to be transparent, the first embroidery 131 can be seen therethrough when the second embroidery 133 is in process. As previously described, when the punching holes 125a are formed with a predetermined gap therebetween, the separable portion 125 of the sheet is easily separated when the embroidery 130 is embroidered on the sheet 120 between the punching holes 125a so that the sheet separable portion 125 can be clearly separated.

The manufacturing process will now be sequentially described with reference to FIG. 4A to FIG. 4G.

Figure 4A:
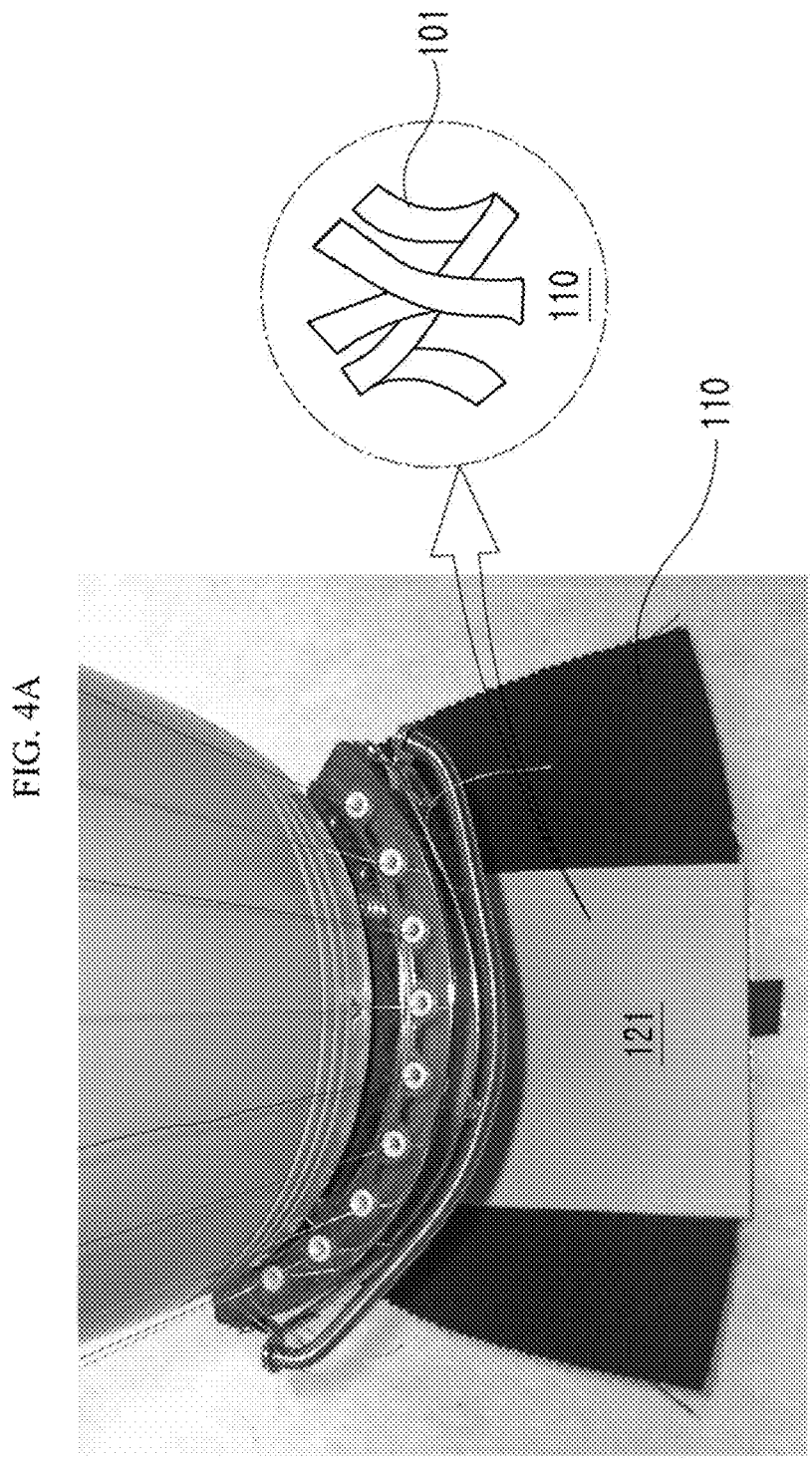

As shown in FIG. 4A, the first sheet 121 is disposed on the fabric panel 110. Preferably, the first sheet 121 is disposed on a front panel of a cap when the first sheet 121 is used in a cap. The first sheet 121 is formed with transparent EVA resin having excellent chemical resistivity and durability to prevent deformation due to frequent laundering, and has a thickness of about 2 mm for ease in sewing using a general embroidery machine.

As shown in FIG. 4B, the first embroidery 131 is embroidered along the inside rather than the outer edge of the desired embroidery design 101 on the first sheet 121 disposed on the fabric panel 110.

As shown in FIG. 4C, when the separable portion 125 is removed from the fabric panel 110 by lifting the first sheet 121 with predetermined force, the first sheet 121 is primarily covered by the first embroidery 131.

As stated above, the first sheet 121 can be punched with a predetermined hole by an embroidery needle so that the first sheet 121 can be easily separated during embroidering for forming the first embroidery 131.

Figure 4D:
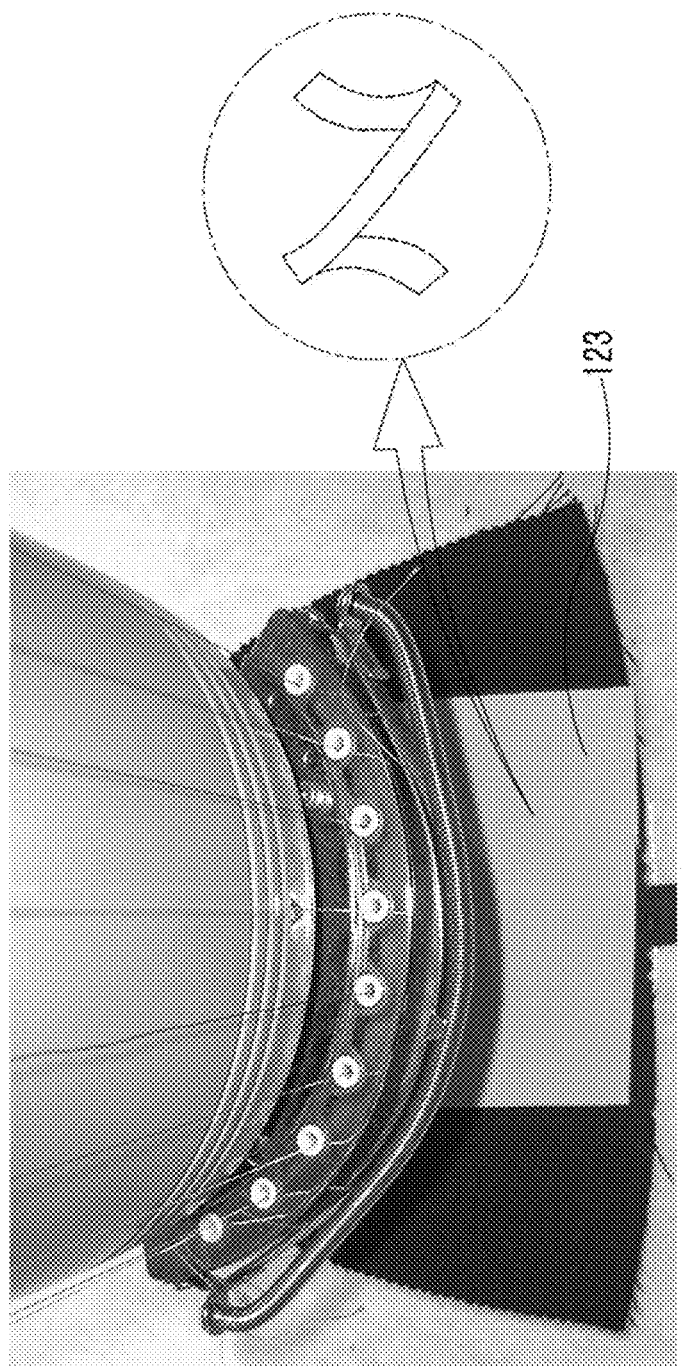

As shown in FIG. 4D, the second sheet 123 is disposed on the first embroidery 131. When the second sheet 123 is transparent, the location of the first embroidery 131 can be easily determined.

Figure 4E:
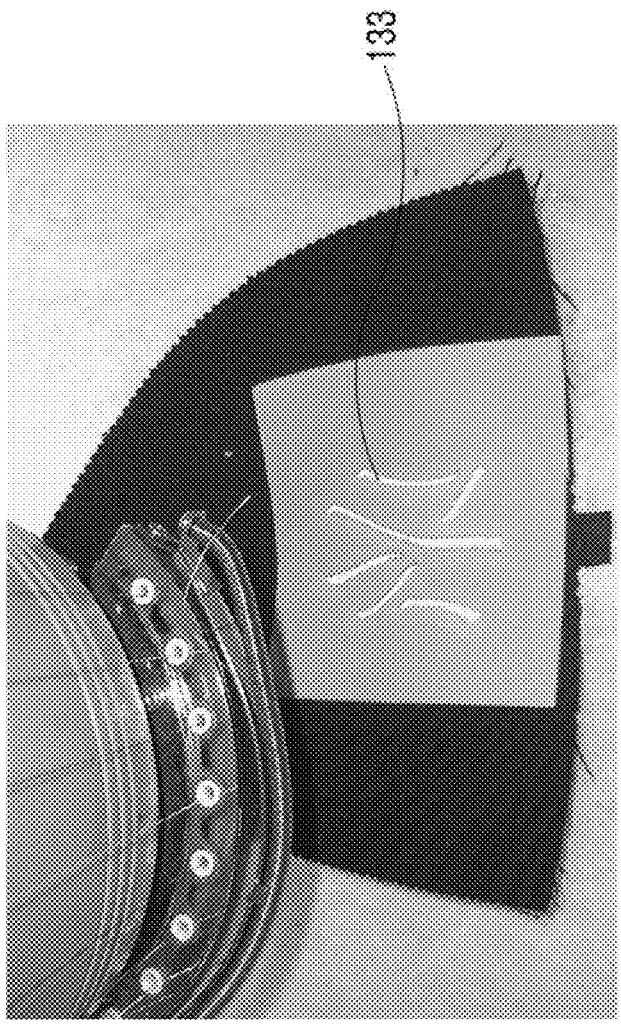

As shown in FIG. 4E, the second embroidery 133 is formed at the upper center of the first embroidery 131 by embroidering inside the outer edge of the first embroidery 131 on the sheet 120 such that a sharp three-dimensional effect can be provided.

Figure 4F:
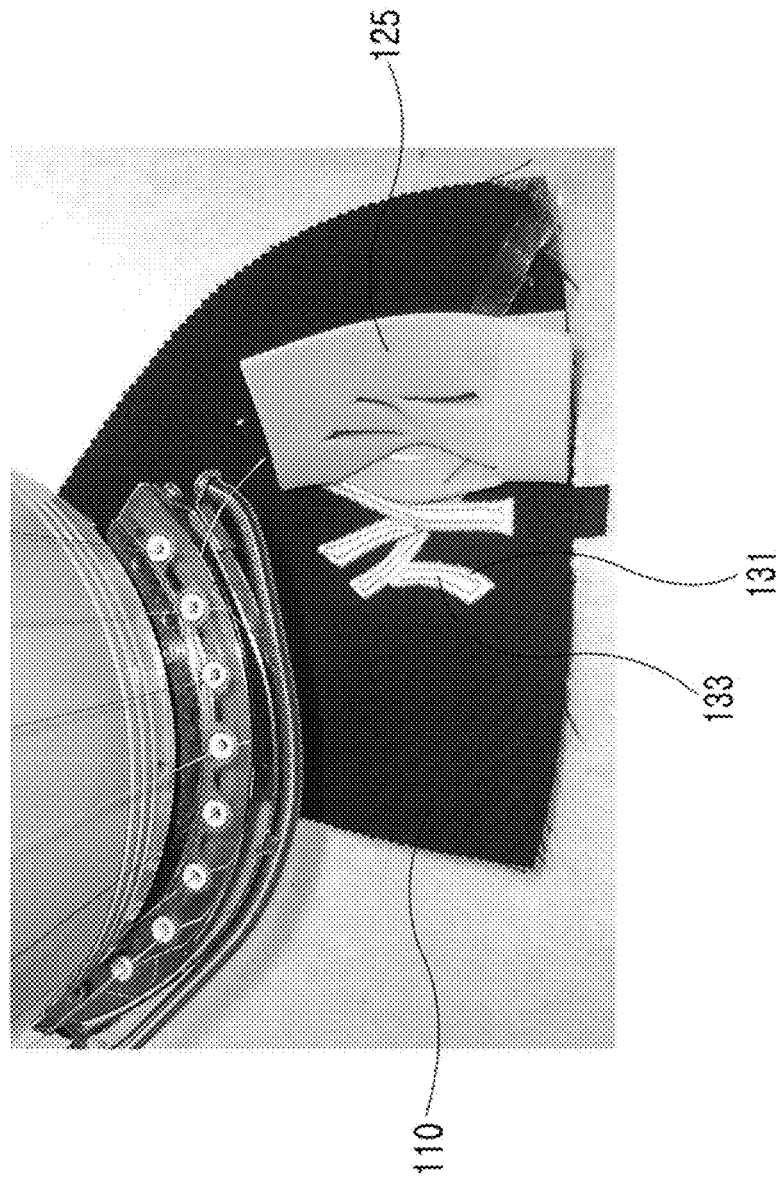

As shown in FIG. 4F, the separable portion 125 of the sheet is removed by lifting it with predetermined force from the second embroidery 133. In this case, the second sheet 123 is primarily covered by the second embroidery 133.

Figure 4G:
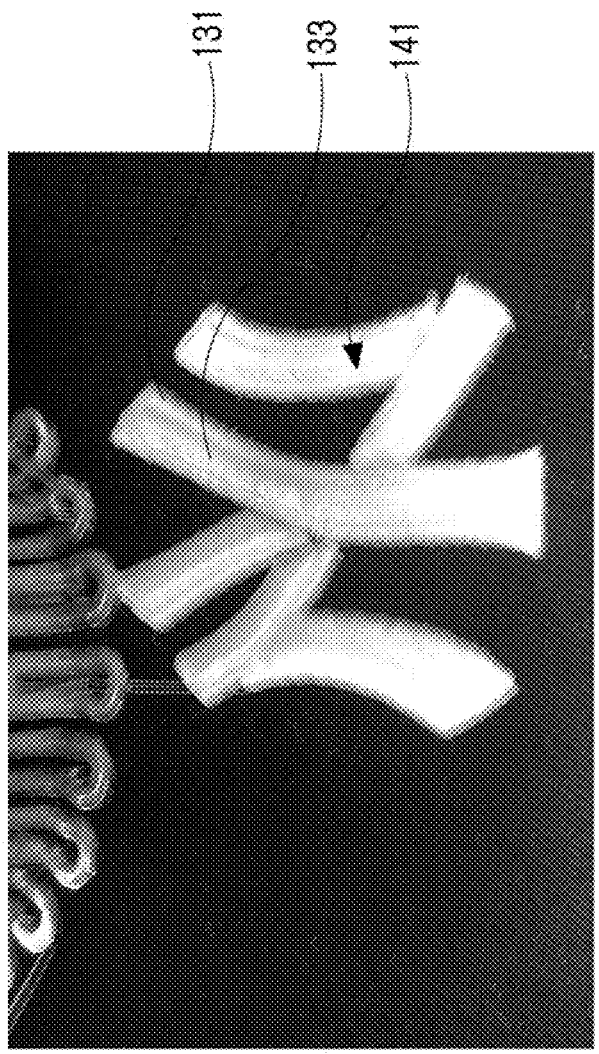

As shown in FIG. 4G, the covering member 141 is formed by embroidering along the desired embroidery design 101 covering the external circumference of the first embroidery 131.

In this case, since the covering member 141 covers the external circumferential line of the first embroidery 131 and the external circumferential line of the second embroidery 133, the residue of the first and second sheets 121 and 123 remaining in the external circumferential lines of the first and second embroidery 131 and 133 can be completely covered.

Accordingly, the manufacturing method of the three-dimensional embroidery according to the exemplary embodiment of the present invention can save time for determining a product failure or cleaning the sheet residue, and can provide high quality with sufficient aesthetic sensibility and three-dimensional effect.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. Those skilled in the art can understand from the above description that the present invention may have various changes and modifications without departing from the scope of the present invention. The scope of the present invention is defined by the appended claims rather than by the description preceding them, and all changes and modifications that fall within the bounds of the claims, or equivalencies of such bounds, are therefore intended to be embraced by the claims.

DESCRIPTION OF SYMBOLS

110: fabric panel
101: embroidery design
120: sheets or a set of sheets
125: separable portion
121: first sheet
125a: punching hole
123: second sheet
141: covering member
130: embroidery
131: first embroidery
133: second embroidery
141: embroidery covering member
143: appliqué covering member

What is claimed is:

1. A manufacturing method of three-dimensional embroidery, comprising:
   disposing a first sheet on the upper surface of a fabric panel;
   embroidering first embroidery on the first sheet;
   removing a separable portion of the first sheet at the circumference of the first embroidery;
   disposing a second sheet on the upper surface of the first embroidery;
   embroidering second embroidery inside the outer edge of the first embroidery on the second sheet;
   removing a separable portion of the second sheet at the circumference of the second embroidery; and
   covering the first and second embroidery with a predetermined design.

2. The manufacturing method of claim 1, wherein the first and second sheets are made of one of a soft material, a semi-rigid elastic material, and a synthetic resin film.

3. The manufacturing method of claim 1, wherein the first and second sheets are formed with an EVA resin.

4. The manufacturing method of claim 1, wherein the covering comprises forming an embroidery covering member to cover the first and second embroidery with a predetermined design.

5. The manufacturing method of claim 1, wherein the covering comprises forming an appliqué covering member to cover the first and second embroidery with a predetermined design.

6. The manufacturing method of claim 1, further comprising determining whether to repeat disposing of a sheet, embroidering, and removing of the separable portions of the sheet before the covering.

* * * * *